United States Patent
Choi et al.

(10) Patent No.: US 12,556,372 B2
(45) Date of Patent: Feb. 17, 2026

(54) MEMORY CONTROLLER AND STORAGE DEVICE INCLUDING SAME

(71) Applicant: SK hynix Inc., Gyeonggi-do (KR)

(72) Inventors: Han Choi, Gyeonggi-do (KR); Jae Yeon Won, Gyeonggi-do (KR); Cheon Ok Jeong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 353 days.

(21) Appl. No.: 18/186,203

(22) Filed: Mar. 20, 2023

(65) Prior Publication Data

US 2024/0097885 A1   Mar. 21, 2024

(30) Foreign Application Priority Data

Sep. 16, 2022  (KR) .......................... 10-2022-0117235

(51) Int. Cl.
*H04L 29/06* (2006.01)
*H04L 9/08* (2006.01)

(52) U.S. Cl.
CPC ............ *H04L 9/0822* (2013.01); *H04L 9/088* (2013.01); *H04L 9/0894* (2013.01)

(58) Field of Classification Search
CPC ..... H04L 9/0822; H04L 9/088; H04L 9/0894; H04L 9/0861; G06F 2212/402; G06F 12/1408; G06F 12/1466; G06F 2212/1052; G06F 21/602
See application file for complete search history.

(56) References Cited

U.S. PATENT DOCUMENTS

| | | | |
|---|---|---|---|
| 7,673,155 B2 * | 3/2010 | Hashimoto | G06F 21/126 380/226 |
| 9,355,279 B1 * | 5/2016 | Takahashi | H04L 9/083 |
| 11,295,025 B2 * | 4/2022 | Medwed | G06F 21/602 |
| 2009/0086978 A1 | 4/2009 | McAvoy et al. | |
| 2012/0233472 A1 * | 9/2012 | Faraboschi | G06F 12/1466 713/193 |

(Continued)

FOREIGN PATENT DOCUMENTS

| KR | 10-2020-0063948 A | 6/2020 |
|---|---|---|
| KR | 10-2021-0077839 A | 6/2021 |

OTHER PUBLICATIONS

"TCG Storage Security Subsystem Class (SSC): Key Per I/O", Version 1.00, Trusted Computing Group, Apr. 17, 2023.

(Continued)

*Primary Examiner* — Mahfuzur Rahman
(74) *Attorney, Agent, or Firm* — IP & T GROUP LLP

(57) ABSTRACT

The present disclosure relates to a storage device including a memory device to which a namespace including a plurality of zones is applied, a cache memory caching a media encryption key corresponding to each of a plurality of key tags, an encryptor encrypting data subject to a write request in response to a command input from a host by using a media encryption key corresponding to a key tag included in the command, and outputting encrypted data, and a write operation controller controlling the memory device to store the encrypted data in the memory device, wherein the media encryption key is a second media encryption key generated based on a first media encryption key provided from the host and a Root of Trust (RoT) generated from the encryptor.

20 Claims, 9 Drawing Sheets

(56) References Cited

U.S. PATENT DOCUMENTS

| | | | |
|---|---|---|---|
| 2014/0237261 A1* | 8/2014 | Diep | G06F 12/1408 |
| | | | 713/189 |
| 2020/0202012 A1* | 6/2020 | Shanbhogue | G06F 12/0804 |
| 2021/0312057 A1* | 10/2021 | Kloth | G06F 21/575 |
| 2022/0006653 A1* | 1/2022 | Ghetie | H04L 63/0428 |
| 2023/0289300 A1* | 9/2023 | Wu | G06F 3/0626 |
| 2024/0061784 A1* | 2/2024 | Wu | G06F 12/0895 |
| 2024/0097885 A1* | 3/2024 | Choi | G06F 12/1408 |

OTHER PUBLICATIONS

NVM Express, Inc., NVM Express Base Specification, NVM Express Revision 2.1, Aug. 5, 2024, p. 1-685, NVM Express, Inc.

* cited by examiner

MEMORY CONTROLLER AND STORAGE DEVICE INCLUDING SAME

CROSS-REFERENCE TO RELATED APPLICATION

The present application claims priority under 35 U.S.C. § 119(a) to Korean patent application number 10-2022-0117235 filed on Sep. 16, 2022, the entire disclosure of which is incorporated by reference herein.

BACKGROUND

1. Technical Field

Various embodiments of the present disclosure relate generally to an electronic device, and more particularly, to a storage device including a memory device and a memory controller.

2. Related Art

A storage device is configured to store data in response to control of a host device such as a computer or a smartphone. A storage device may include a memory device configured to store data and a memory controller configured to control the memory device. Memory devices may be divided into volatile memory devices and non-volatile memory devices.

A non-volatile memory device may not lose data even in the absence of power supply. Types of non-volatile memory devices may include Read Only Memory (ROM), Programmable ROM (PROM), Electrically Programmable ROM (EPROM), Electrically Erasable and Programmable ROM (EEPROM), flash memory, and the like.

A storage device may ensure data security by encrypting user data using an encryption algorithm and providing the user data only when a user is verified by way of user authentication. If an encryption key is leaked, the encrypted user data may be decrypted. Thus, it is important to manage the encryption key as well as encryption of the user data.

SUMMARY

Various embodiments of the present disclosure are directed to a memory controller capable of supporting an improved management method of an encryption key and a storage device including the memory controller.

According to an embodiment of the present disclosure, a storage device may include a memory device to which a namespace including a plurality of zones is applied, a cache memory caching a media encryption key corresponding to each of a plurality of key tags, an encryptor encrypting data subject to a write request in response to a command input from a host by using a media encryption key corresponding to a key tag included in the command, and outputting encrypted data, and a write operation controller controlling the memory device to store the encrypted data in the memory device, wherein the media encryption key is a second media encryption key generated based on a first media encryption key provided from the host and a Root of Trust (RoT) generated from the encryptor.

According to an embodiment of the present disclosure, a memory controller may include a cache memory caching a media encryption key corresponding to each of a plurality of key tags, an encryptor encrypting data subjected to a write request in response to a command input from a host by using a media encryption key corresponding to a key tag included in the command, and outputting encrypted data, and a write operation controller controlling the memory device to store the encrypted data in the memory device, wherein the media encryption key is a second media encryption key generated based on a first media encryption key provided from the host and a Root of Trust (RoT) generated from the encryptor.

According to an embodiment of the present disclosure, an operating method of a controller may include decrypting, through a plaintext first key, a first-encrypted second key to generate a plaintext second key, encrypting plaintext user data to be stored in a memory device, or decrypting the encrypted user data received from the memory device, through the plaintext second key, and encrypting, through a third key, the plaintext second key to generate a second-encrypted second key. Each of the plaintext user data, and the first-encrypted second key is provided from a host.

DETAILED DESCRIPTION

Specific structural or functional descriptions of examples of embodiments in accordance with concepts which are disclosed in this specification are illustrated only to describe the examples of embodiments in accordance with the concepts and the examples of embodiments in accordance with the concepts may be carried out by various forms but the descriptions are not limited to the examples of embodiments described in this specification.

Figure 1:
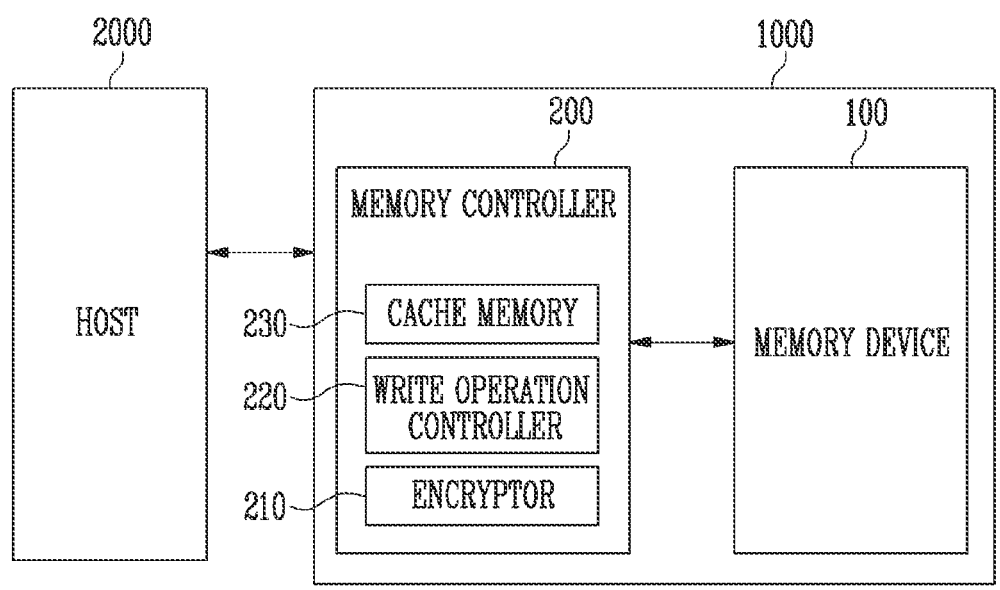
FIG. 1 is a block diagram illustrating a storage device according to an embodiment of the present disclosure.

FIG. 1 is a block diagram illustrating a storage device 1000 according to an embodiment of the present disclosure.

Referring to FIG. 1, the storage device 1000 may include a memory device 100 and a memory controller 200.

The storage device 1000 may store data under the control of a host 2000. Examples of the storage device 1000 may include a cellular phone, a smartphone, an MP3 player, a laptop computer, a desktop computer, a game player, a display device, a tablet PC, and an in-vehicle infotainment system.

The storage device 1000 may be manufactured as one of various types of storage devices according to a host interface corresponding to a communication method with the host 2000. For example, the storage device 1000 may be configured as any of various kinds of storage devices such as a solid state drive (SSD), a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a Personal Computer Memory Card International Association (PCMCIA) card type storage device, a peripheral component interconnection (PCI) card type storage device, a PCI express (PCI-E) card type storage device, a compact flash (CF) card, a smart media card, and a memory stick.

The storage device 1000 may be manufactured as any of various types of packages. The storage device 1000 may be manufactured as any of various types of packages. For example, the storage device 1000 may be manufactured as any of various package types, such as a package-on-package (POP), a system-in-package (SIP), a system-on-chip (SOC), a multi-chip package (MCP), a chip-on-board (COB), a wafer-level fabricated package (WFP), and a wafer-level stack package (WSP).

The memory device 100 may store data or utilize stored data. More specifically, the memory device 100 may operate in response to control of the memory controller 200. In addition, the memory device 100 may include a plurality of memory dies, each of which may include a memory cell array including a plurality of memory cells which store data.

Each of the memory cells may be configured as a Single Level Cell (SLC) capable of storing one data bit, a Multi-Level Cell (MLC) capable of storing two data bits, a Triple Level Cell (TLC) capable of storing three data bits, or a Quad Level Cell (QLC) capable of storing four data bits.

The memory cell array may include a plurality of memory blocks. Each of the memory blocks may include a plurality of memory cells. One memory block may include a plurality of pages. A page may be a unit for storing data in the memory device 100, or a unit for reading data stored in the memory device 100.

Examples of the memory device 100 may include Double Data Rate Synchronous Dynamic Random Access Memory (DDR SDRAM), Low Power Double Data Rate4 (LPDDR4) SDRAM, Graphics Double Data Rate (GDDR) SDRAM, Low Power DDR (LPDDR), Rambus Dynamic Random Access Memory (RDRAM), NAND flash memory, vertical NAND flash memory, NOR flash memory, resistive random access memory (RRAM), phase-change random access memory (PRAM), magnetoresistive random access memory (MRAM), ferroelectric random access memory (FRAM), and spin transfer torque random access memory (STT-RAM). In this specification, by way of example, features and aspects of the invention are described in the context in which the memory device 100 is a NAND flash memory.

The memory device 100 may receive a command and an address from the memory controller 200. The memory device 100 may access an area selected in response to the received address in the memory cell array. When the memory device 100 accesses the selected area, the memory device 100 may perform an operation corresponding to the received command on the selected area. For example, the memory device 100 may perform a write operation (a program operation), a read operation, and an erase operation. A program operation may refer to an operation by which the memory device 100 writes data into the area selected by the address. A read operation may refer to an operation by which the memory device 100 reads data from the area selected by the address. An erase operation may refer to an operation in which the memory device 100 erases the data stored in the area selected by the address.

The memory controller 200 may control general operations of the memory device 1000100. More specifically, the memory controller 200 may execute firmware FW when power is applied to the storage device 1000. The firmware FW may include a host interface layer (HIL) that receives a request input from the host 2000 or outputs a response to the host 2000, a flash translation layer (FTL) that manages operations between an interface of the host 2000 and an interface of the memory device 100, and a flash interface layer (FIL) that provides a command to the memory device 100 or receives a response from the memory device 100.

The memory controller 200 may receive data and a logical address LA from the host 2000 and map the logical address LA into a physical address PA which indicates an address of memory cells where the data in the memory device 100 is stored. The logical address LA may be a logical block address LBA and the physical address PA may be a physical block address PBA.

The memory controller 200 may control the memory device 100 to perform a program operation, a read operation, or an erase operation at the request of the host 2000. During a program operation, the memory controller 200 may provide a program command, a physical block address, and data to the memory device 100. During a read operation, the memory controller 200 may provide a read command and a physical block address to the memory device 100. During an erase operation, the memory controller 200 may provide an erase command and a physical block address to the memory device 100.

The memory controller 200 may control the memory device 100 to perform a program operation, a read operation or an erase operation regardless of a request from the host 2000. For example, the memory controller 200 may control the memory device 100 to perform a program operation, a read operation, or an erase operation used to perform background operations such as wear leveling, garbage collection and read reclaim.

According to an embodiment of the present disclosure, the memory controller 200 may include an encryptor 210, a write operation controller 220, and a cache memory 230. The encryptor 210 may encrypt user data or decrypt the encrypted user data. More specifically, the encryptor 210 may encrypt the user data by using a media encryption key corresponding to a key tag included in a command which is input from the host 2000. According to an embodiment, the encryptor 210 may encrypt the media encryption key or decrypt the encrypted media encryption key for encrypting the user data or decrypting the encrypted user data. The encryptor 210 may encrypt a key encryption key or decrypt the encrypted key encryption key for encrypting the media encryption key or decrypting the encrypted media encryption key. The write operation controller 220 may control the memory device 100 to store the encrypted user data in the memory device 100. According to an embodiment, the write operation controller 220 may control the memory device 100 to store the encrypted media key. In addition, the cache memory 230 may cache a media encryption key corresponding to each of a plurality of key tags.

The host 2000 may communicate with the storage device 1000 by using at least one of various communication standards or interfaces, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and/or a Load Reduced DIMM (LRDIMM).

Figure 2:
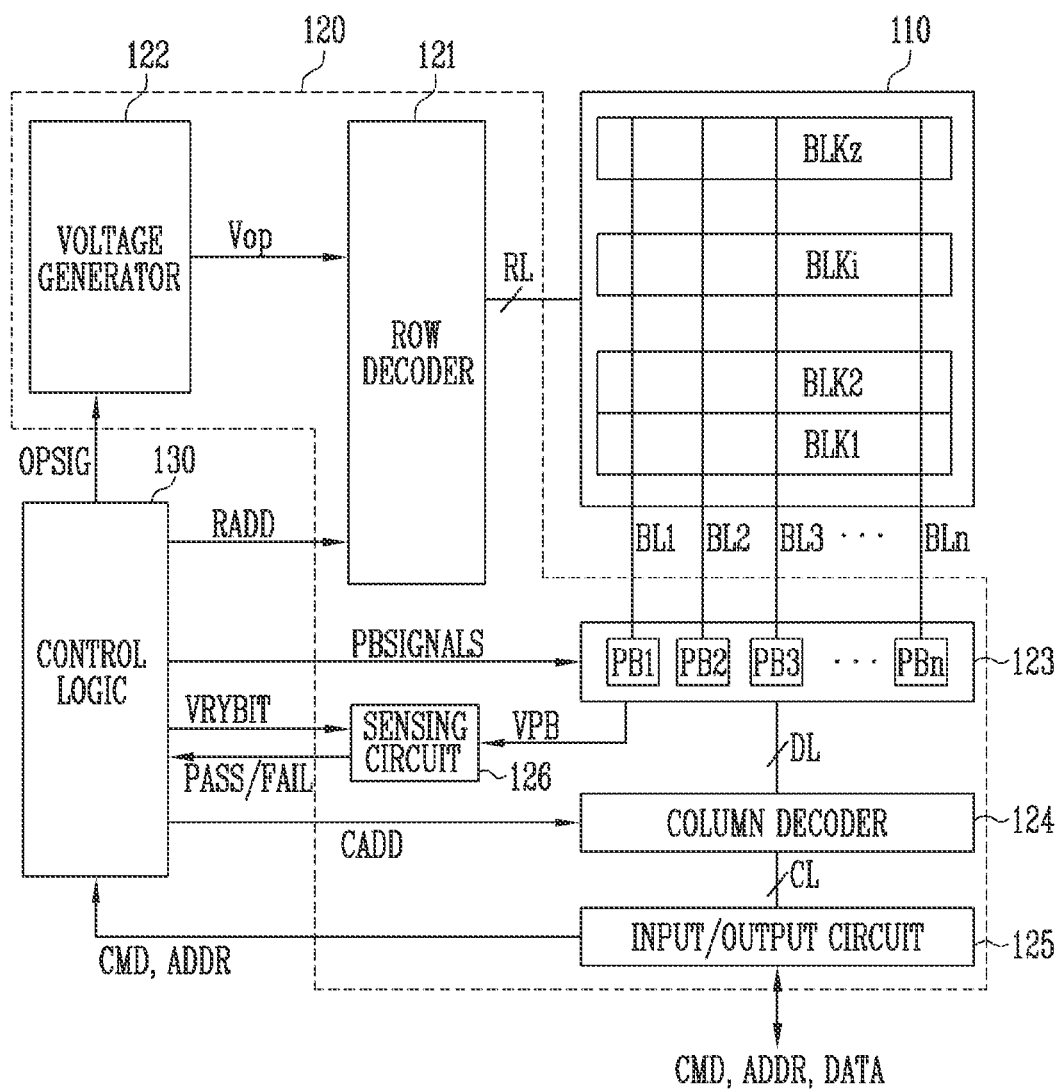
FIG. 2 is a block diagram illustrating a memory device according to an embodiment of the present disclosure.

FIG. 2 is a diagram illustrating the memory device 100 according to an embodiment of the present disclosure.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz may be coupled to a row decoder 121 through row lines RL. The row lines RL may include at least one source select line, a plurality of word lines and at least one drain select line. The plurality of memory blocks BLK1 to BLKz may be coupled to a page buffer group 123 through bit lines BL1 to BLn. Each of the plurality of memory blocks BLK1 to BLKz may include a plurality of memory cells. According to an embodiment, the plurality of memory cells may be non-volatile memory cells. Memory cells coupled to the same word line may be defined as one page. Therefore, each memory block may include a plurality of pages.

Each of the memory cells included in the memory cell array 110 may be configured as a Single Level Cell (SLC) capable of storing one data bit, a Multi-Level Cell (MLC) capable of storing two data bits, a Triple Level Cell (TLC) capable of storing three data bits, or a Quad Level Cell (QLC) capable of storing four data bits.

The peripheral circuit 120 may perform a program operation, a read operation, or an erase operation on a selected area of the memory cell array 110 in response to control of the control logic 130. The peripheral circuit 120 may drive the memory cell array 110 in response to the control logic 130. For example, the peripheral circuit 120 may apply various operating voltages to the row lines RL and the bit lines BL1 to BLn, or may discharge the applied voltages in response to control of the control logic 130.

More specifically, the peripheral circuit 120 may include the row decoder 121, a voltage generator 122, the page buffer group 123, a column decoder 124, an input/output circuit 125, and a sensing circuit 126.

The row decoder 121 may be coupled to the memory cell array 110 through the row lines RL. The row lines RL may include at least one source select line, a plurality of word lines, and at least one drain select line. According to an embodiment, the word lines may include normal word lines and dummy word lines. In addition, the row lines RL may further include a pipe select line.

The row decoder 121 may operate in response to control of the control logic 130. The row decoder 121 may receive a row address RADD from the control logic 130. More specifically, the row decoder 121 may decode the row address RADD. The row decoder 121 may select at least one memory block among the memory blocks BLK1 to BLKz according to the decoded row address RADD. The row decoder 121 may select at least one word line of the selected memory block so as to apply voltages generated by the voltage generator 122 to at least one word line according to the decoded address.

For example, during a program operation, the row decoder 121 may apply a program voltage to a selected word line and a program pass voltage having a lower voltage level than the program voltage to unselected word lines. During a program verify operation, the row decoder 121 may apply a verify voltage to the selected word line and a verify pass voltage greater than the verify voltage to the unselected word lines. During a read operation, the row decoder 121 may apply a read voltage to the selected word line and a read pass voltage greater than the read voltage to the unselected word lines.

According to an embodiment, an erase operation of the memory cell array 110 may be performed in units of memory blocks. During an erase operation, the row decoder 121 may select one of the memory blocks according to the decoded address, and the row decoder 121 may apply a ground voltage to word lines coupled to the selected memory block.

The voltage generator 122 may operate in response to control of the control logic 130. More specifically, the voltage generator 122 may generate a plurality of voltages by using an external power voltage supplied to the memory device 100 in response to the control logic 130. For example, the voltage generator 122 may generate a program voltage, a verify voltage, a pass voltage, a read voltage, and an erase voltage in response to the control of the control logic 130. The voltage generator 122 may generate various operating voltages Vop for program, read and erase operations in response to an operation signal OPSIG.

According to an embodiment, the voltage generator 122 may generate an internal power voltage by regulating the external power voltage. The internal power voltage generated by the voltage generator 122 may serve as an operating voltage of the memory cell array 110.

According to an embodiment, the voltage generator 122 may generate a plurality of voltages by using the external power voltage or the internal power voltage. For example, the voltage generator 122 may include a plurality of pumping capacitors which receive the internal power voltage and may generate a plurality of voltages by selectively activating the plurality of pumping capacitors in response to the control of the control logic 130. In addition, the plurality of generated voltages may be supplied to the memory cell array 110 by the row decoder 121.

The page buffer group 123 may include first to nth page buffers PB1 to PBn. The first to nth page buffers PB1 to PBn may be coupled to the memory cell array 110 through the first to nth bit lines BL1 to BLn, respectively. In addition, the control logic 130 may control the first to nth page buffers PB1 to PBn to operate. More specifically, the first to nth page buffers PB1 to PBn may operate in response to page buffer control signals PBSIGNALS. For example, the first to nth page buffers PB1 to PBn may temporarily store data received through the first to nth bit lines BL1 to BLn, or may sense voltages or currents in the first to nth bit lines BL1 to BLn during a read or verify operation.

More specifically, during a program operation, the first to nth page buffers PB1 to PBn may transfer data DATA received through the input/output circuit 125 to selected memory cells through the first to nth bit lines BL1 to BLn when a program pulse is applied to a selected word line. Memory cells of the selected page may be programmed according to the transferred data DATA. A memory cell coupled to a bit line to which a program permission voltage (e.g., a ground voltage) is applied may have an increased threshold voltage. A threshold voltage of a memory cell coupled to a bit line to which a program inhibition voltage (for example, a power voltage) is applied may be maintained.

During a program verify operation, the first to nth page buffers PB1 to PBn may read page data from the selected memory cells through the first to nth bit lines BL1 to BLn, respectively.

During a read operation, the first to nth page buffers PB1 to PBn may read the data DATA from the memory cells of the selected page through the first to nth bit lines BL1 to BLn and may output the read data DATA to the input/output circuit 125 in response to control of the column decoder 124.

During an erase operation, the first to nth page buffers PB1 to PBn may float the first to nth bit lines BL1 to BLn. The column decoder 124 may transfer data between the input/output circuit 125 and the page buffer group 123 in response to a column address CADD. For example, the column decoder 124 may exchange data with the first to nth page buffers PB1 to PBn through data lines DL, or may exchange data with the input/output circuit 125 through column lines CL.

The input/output circuit 125 may transfer a command CMD and an address ADDR from the memory controller 200 to the control logic 130, or may exchange the data DATA with the column decoder 124.

A sensing circuit 126 may generate a reference current in response to an allowable bit signal VRYBIT and compare a sensing voltage VPB received from the page buffer group 123 with a reference voltage generated by the reference current to output a pass signal PASS or a fail signal FAIL during a read operation or a verify operation.

The control logic 130 may control the peripheral circuit 120 by outputting the operation signal OPSIG, the row address RADD, the page buffer control signals PBSIGNALS, and the allowable bit signal VRYBIT in response to the command CMD and the address ADDR.

In addition, the control logic 130 may determine whether the verify operation passes or fails in response to the pass signal PASS or the fail signal FAIL. In addition, the control logic 130 may control the page buffer group 123 to temporarily store verify information which includes the pass signal PASS or the fail signal FAIL in the page buffer group 123. More specifically, the control logic 130 may determine a program state of a memory cell in response to the pass signal PASS or the fail signal FAIL. For example, when a memory cell operates as a triple level cell (TLC), the control logic 130 may determine whether the program state of the memory cell is an erase state E or one of the first to seventh program states P1 to P7.

Figure 3:
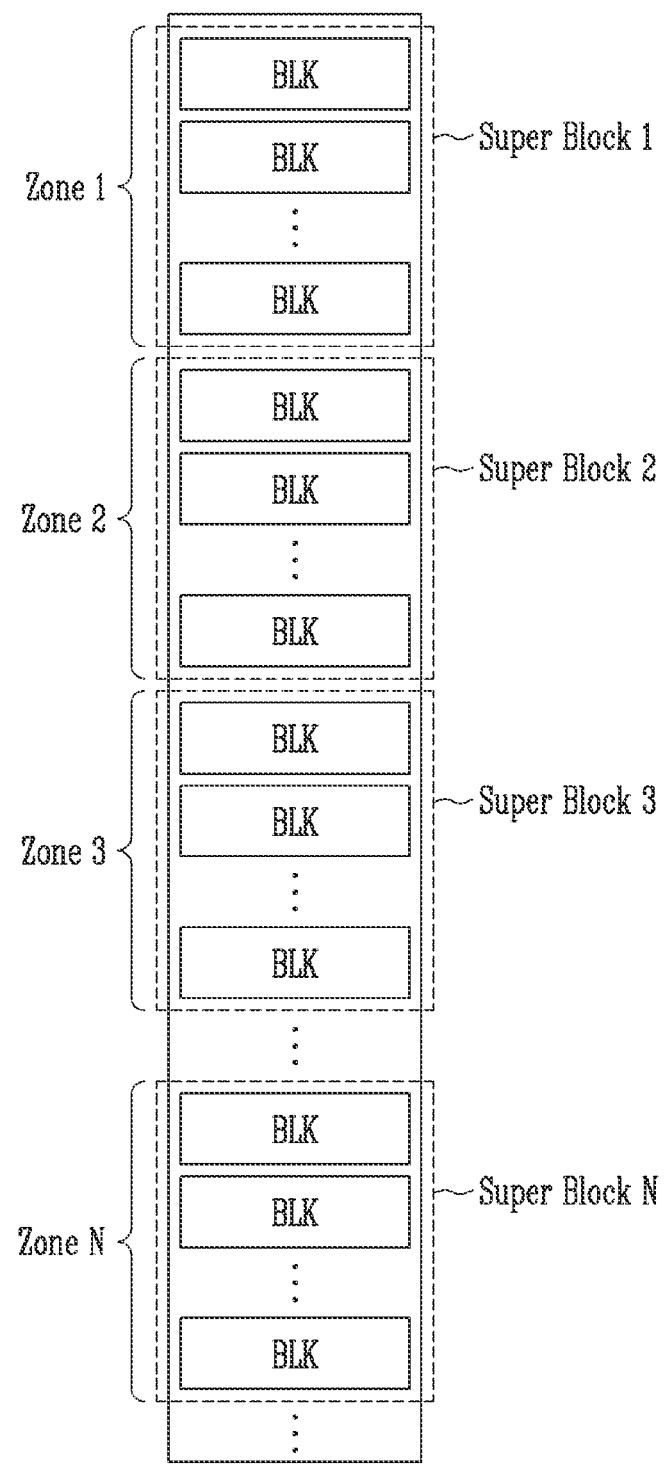
FIG. 3 is a block diagram illustrating a namespace according to an embodiment of the present disclosure.

FIG. 3 is a block diagram illustrating a namespace according to an embodiment of the present disclosure.

Referring to FIGS. 1 and 3, a namespace which includes a plurality of zones may be applied to the memory cell array 110. In addition, each of the plurality of zones may include a plurality of memory blocks BLK. More specifically, each of first to Nth zones Zone 1 to Zone N may include a plurality of memory blocks, and may correspond to a super block which includes a plurality of memory blocks. For example, a first super block Super Block 1 to an Nth super block Super Block N may correspond to a first zone 1 to an Nth zone Zone N, respectively. Each of the super blocks may include a plurality of memory blocks. In addition, the plurality of super blocks may include the same or different numbers of memory blocks.

According to an embodiment, a zone may refer to a storage area corresponding to a logical address group which includes logical addresses. More specifically, each of the plurality of zones may store data corresponding to each of the logical address groups.

According to an embodiment, the plurality of memory blocks may be controlled in units of super blocks. For example, the memory controller 200 may control the memory device 100 to store data in units of super blocks. In addition, the memory controller 200 may control the memory device 100 to store consecutive logical addresses in one super block. In addition, the memory controller 200 may map a logical address and a physical address in units of super blocks.

The description has been made based on one zone corresponding to one super block. However, the present disclosure is not limited thereto. According to embodiments, the number of super blocks which correspond to one zone may vary.

Figure 4:
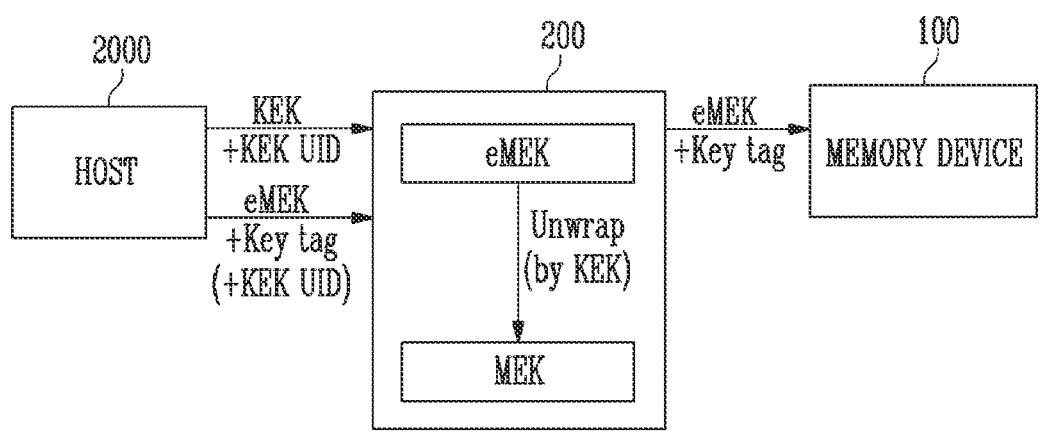
FIG. 4 is a diagram for describing a method of storing a media encryption key according to an embodiment of the present disclosure.

FIG. 4 is a diagram for describing a method of storing a media encryption key according to an embodiment of the present disclosure.

Referring to FIG. 4, a media encryption key which is transferred from the host 2000 may be stored in the memory device 100. The media encryption key may be used to encrypt or decrypt user data.

The host 2000 may transfer, to the memory controller 200, an encrypted media encryption key eMEK and a key encryption key KEK for decrypting (or unwrapping) the encrypted media encryption key eMEK. When the host 2000 transfers the encrypted media encryption key eMEK, the host 2000 may also transfer a key tag. The key tag may include information for identifying a media encryption key MEK which is used to encrypt or decrypt the user data. The media encryption Key MEK is a key to which the encrypted media encryption key eMEK provided with the key tag is decrypted using the key encryption key KEK. For example, the memory controller 200 may decrypt the encrypted media encryption key eMEK by using the key encryption key KEK which is received from the host 2000.

The memory controller 200 may transfer the encrypted media encryption key eMEK and the key tag to the memory device 100, and may control the memory device 100 to store the encrypted media encryption key eMEK and the key tag.

When the key encryption key KEK is injected from the host 2000, a unique identifier (UID) for the corresponding key may also be provided. In addition, information (KEK UID and KEK) about the key encryption key KEK may be stored in the memory device 100.

A maximum of 64K (16-bit field, 2 to the 16th power) media encryption keys which are input by the host 2000 may exist per zone. In addition, a different key encryption key may be used per media encryption key, and a maximum of 64K key encryption keys may exist per zone.

Figure 5:
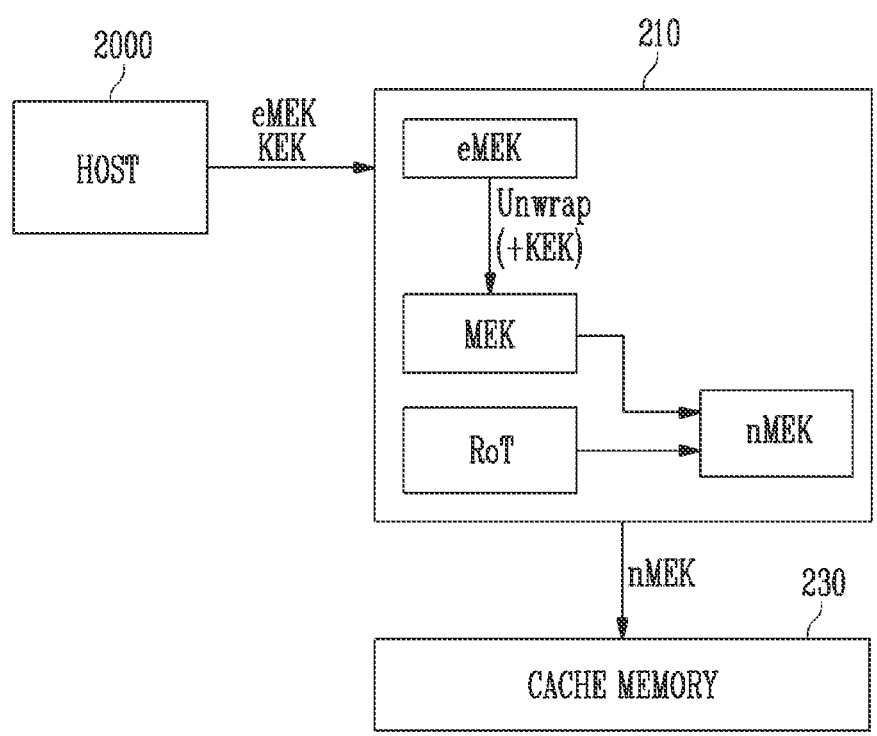
FIG. 5 is a diagram for describing a new media encryption key according to an embodiment of the present disclosure.

FIG. 5 is a diagram for describing a new media encryption key according to an embodiment of the present disclosure.

Referring to FIG. 5, a new media encryption key nMEK may be generated using the encrypted media encryption key eMEK which is received from the host 2000.

The host 2000 may transfer the encrypted media encryption key eMEK and the key encryption key KEK for decrypting (or unwrapping) the encrypted media encryption key eMEK to the memory controller 200.

More specifically, when the encryptor 210 receives the encrypted media encryption key eMEK and the key encryption key KEK, the encryptor 210 may decrypt the encrypted media encryption key eMEK by using the key encryption key KEK.

In addition, the encryptor 210 may generate the new media encryption key nMEK by using the media encryption key MEK and a Root of Trust (RoT). The RoT may include seed data for generating an encryption key, a random number, or data generated based on a password which is input by the user. According to an embodiment, the RoT may correspond to each of the plurality of zones which are included in the memory device 100.

In addition, the cache memory 230 may cache the new media encryption key nMEK which is generated by the encryptor 210.

More specifically, the memory controller 200 may receive the encrypted media encryption key eMEK from the host

2000 and may decrypt the encrypted media encryption key eMEK by using the key encryption key KEK which is transferred in advance. In addition, the memory controller 200 may use the media encryption key MEK when encrypting the user data or decrypting the user data. However, when the media encryption key MEK in plaintext which is temporarily stored in the cache memory 230 is used for encryption or decryption, the media encryption key MEK may be likely leaked. When the media encryption key MEK which is encrypted by another method is used for encryption or decryption, security may be enhanced even if the media encryption key MEK is temporarily stored in the cache memory 230. However, this method may involve a process of searching for the key encryption key KEK used for decrypting the encrypted media encryption key eMEK.

According to an embodiment, the new media encryption key nMEK may be generated by re-encrypting the media encryption key MEK which is injected by the host 2000, and the new media encryption key nMEK may be temporarily stored in the cache memory 230, so that the process of searching for the key encryption key KEK to encrypt or decrypt the user data may be removed. In addition, even when the key encryption key KEK injected by the host 2000 is leaked, a Root of Trust (RoT) may be additionally required, and thus, security may be maintained. According to an embodiment of the present disclosure, the process of searching for the key encryption key KEK for decrypting the encrypted media encryption key eMEK may be skipped, so that resources consumed for encryption or decryption of the user data may be saved. In addition, compared to the method of storing the plaintext media encryption key MEK, security may be more secured.

Figure 6:
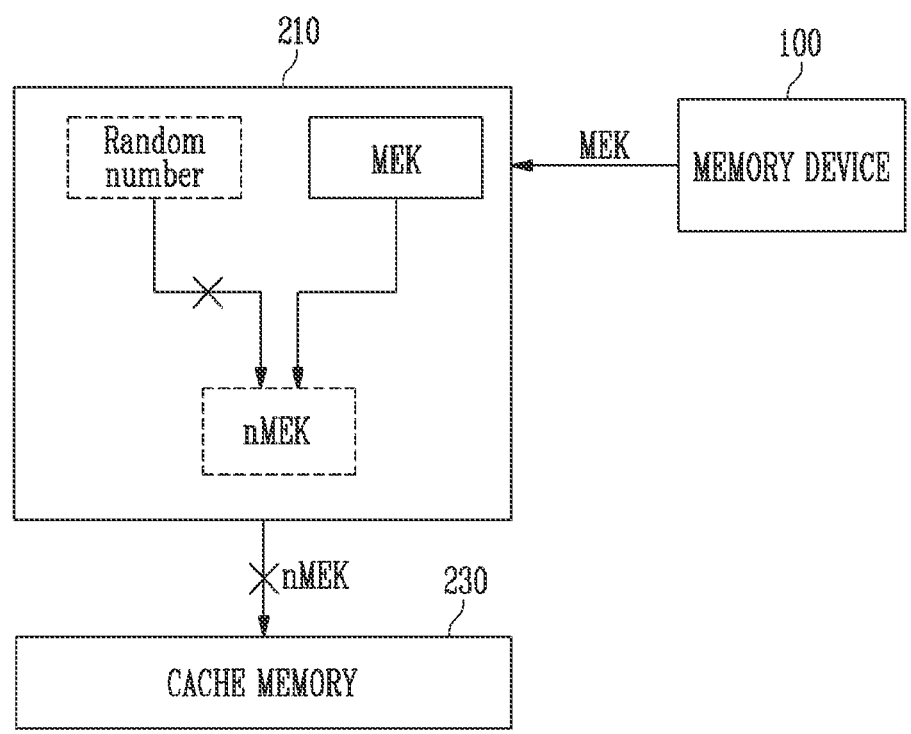
FIG. 6 is a diagram for describing a crypto-erase operation according to an embodiment of the present disclosure.

FIG. 6 is a diagram for describing a crypto-erase operation according to an embodiment of the present disclosure.

Referring to FIGS. 1 and 6, the memory controller 200 may perform a crypto-erase operation. The crypto-erase operation may refer to an operation of erasing a key required for decryption to discard the encrypted data.

According to an embodiment, the memory device 100 may store the encrypted media encryption key eMEK received from the host 2000 and may decrypt the encrypted media encryption key eMEK by using the key encryption key KEK as described above with reference to FIG. 5. The encryptor 210 may receive the encrypted or plaintext media encryption key MEK from the memory device 100. In addition, the encryptor 210 may generate the new media encryption key nMEK based on the media encryption key MEK received from the memory device 100 or the host 2000. For example, the encryptor 210 may generate the new media encryption key nMEK by using the media encryption key MEK and a Root of Trust (e.g., random number).

In addition, according to an embodiment of the present disclosure, the encryptor 210 may perform a crypto-erase operation by erasing the generated random number so as not to decrypt the encrypted data. When the random number is erased, the encryptor 210 may not be able to generate the new media encryption key nMEK, and the encrypted data cannot be decrypted using the new media encryption key nMEK. The random number may correspond to a zone included in the memory device 100, and data which is included in the zone corresponding to the erased random number may not be decrypted.

When a crypto-erase operation is performed on one of the plurality of zones included in the memory device 100, the crypto-erase operation may be performed by erasing a Root of Trust (e.g., a random number) which corresponds to the zone.

Figure 7:
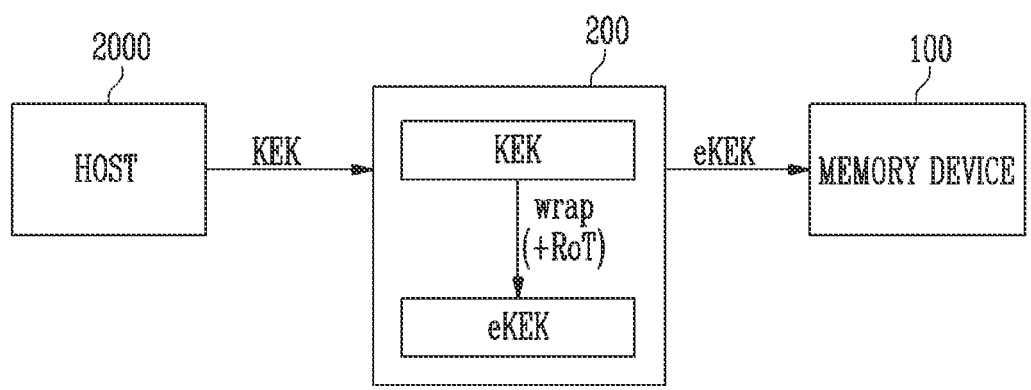
FIG. 7 is a diagram for describing a method of storing a key encryption key according to an embodiment of the present disclosure.

FIG. 7 is a diagram for describing a method of storing a key encryption key according to an embodiment of the present disclosure.

Referring to FIG. 7, the key encryption key KEK which is transferred from the host 2000 may be stored in the memory device 100. The key encryption key KEK may be used to encrypt (or wrap) a media encryption key.

The host 2000 may transfer the key encryption key KEK to the memory controller 200. The memory controller 200 may encrypt (or wrap) the key encryption key KEK from the host 2000 by using the RoT.

The memory controller 200 may transfer an encrypted key encryption key eKEK to the memory device 100 and may control the memory device 100 to store the encrypted key encryption key eKEK.

When the key encryption key KEK is injected from the host 2000, a unique identifier (UID) for the corresponding key may also be provided. In addition, information (KEK UID and KEK) about the key encryption key KEK may be stored in the memory device 100.

A maximum of 64K (16-bit field, 2 to the 16th power) media encryption keys which are input by the host 2000 may exist per zone. In addition, a different key encryption key may be used for each media encryption key, and a maximum of 64K key encryption keys may exist per zone.

Figure 8:
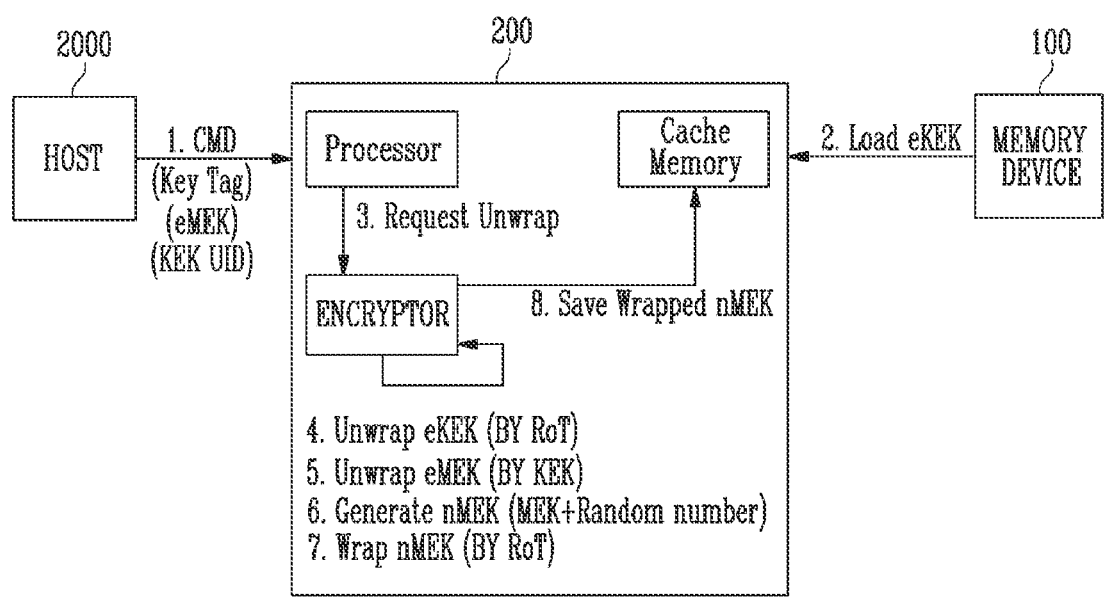
FIG. 8 is a diagram for describing a method of operating a storage device according to an embodiment of the present disclosure.

FIG. 8 is a diagram for describing a method of operating a storage device 1000 according to an embodiment of the present disclosure.

Referring to FIGS. 1 and 8, the storage device 1000 may generate the new media encryption key nMEK in response to a command which is received from the host 2000. The storage device 1000 may encrypt or decrypt the user data by using the generated new media encryption key nMEK.

The storage device 1000 may generate the new media encryption key nMEK in response to the control of the host 2000. More specifically, the host 2000 may transfer a command such that the storage device 1000 may encrypt the user data. The command may include the encrypted media encryption key eMEK, a key tag for identifying a media encryption key, and a KEK Unique Identifier (UID) for identifying a key encryption key.

In addition, the memory controller 200 may load the encrypted key encryption key eKEK corresponding to the encrypted media encryption key eMEK from the memory device 100 so as to decrypt the encrypted media encryption key eMEK received from the host 2000. When, as a result of referring to a key cache table, the encrypted media encryption key eMEK corresponding to the key tag exists in the cache memory, the memory controller 200 may decrypt the encrypted media encryption key eMEK, and may encrypt or decrypt the user data using the media encryption key MEK. The key cache table may refer to a table which includes information (e.g., a key tag) about the media encryption key which is cached in the cache memory.

The memory controller 200 may load the encrypted key encryption key eKEK previously stored in the memory device 100. The memory controller 200 may decrypt the encrypted key encryption key eKEK by using the RoT. The memory controller 200 may decrypt the encrypted media encryption key eMEK using the key encryption key KEK. More specifically, the encryptor 210 of the memory controller 200 may receive a request for decrypting the encrypted media encryption key eMEK and the encrypted key encryption key eKEK from the processor of the memory controller 200. The encrypted key encryption key eKEK may refer to a key which is encrypted using the RoT. Thus, the encryptor 210 may decrypt the encrypted key encryption key eKEK using the RoT. Subsequently, the encryptor 210 may decrypt the encrypted media encryption key eMEK using the key encryption key KEK.

In addition, the encryptor 210 may generate the new media encryption key nMEK by using the media encryption key MEK and a random number. In addition, the encryptor 210 may encrypt the new media encryption key nMEK using the RoT and store the encrypted new media encryption key in the cache memory.

According to an embodiment, an operating method of the memory controller 200, the operating method may include decrypting, through a plaintext first key, a first-encrypted second key to generate a plaintext second key, encrypting plaintext user data to be stored in the memory device 100, or decrypting the encrypted user data received from the memory device 100, through the plaintext second key, and encrypting, through a third key, the plaintext second key to generate a second-encrypted second key. Each of the plaintext user data, and the first-encrypted second key is provided from the host 2000.

For example, the plaintext first key may be the key encryption key KEK. The plaintext second key may be the media encryption key MEK. The first-encrypted second key may be the encrypted media encryption key eMEK. The second-encrypted second key may be the new media encryption key nMEK. The third key may be RoT.

According to an embodiment, the operating method may include decrypting, through a third key, the second-encrypted second key, to generate the plaintext second key.

According to an embodiment, the operating method may include performing a crypto-erase operation of discarding the third key so as not to decrypt the plaintext second key.

According to an embodiment, the third key may correspond to each of a plurality of zones included in the memory device 100 to which a namespace is applied.

According to an embodiment, the operating method may include encrypting, through the third key, the plaintext first key to generate an encrypted first key to be stored in the memory device. For example, the encrypted first key may be the encrypted key encryption key eKEK According to an embodiment, the decrypting the first-encrypted second key may include decrypting, through the third key, the encrypted first key received from the memory device, to generate the plaintext first key.

Figure 9:
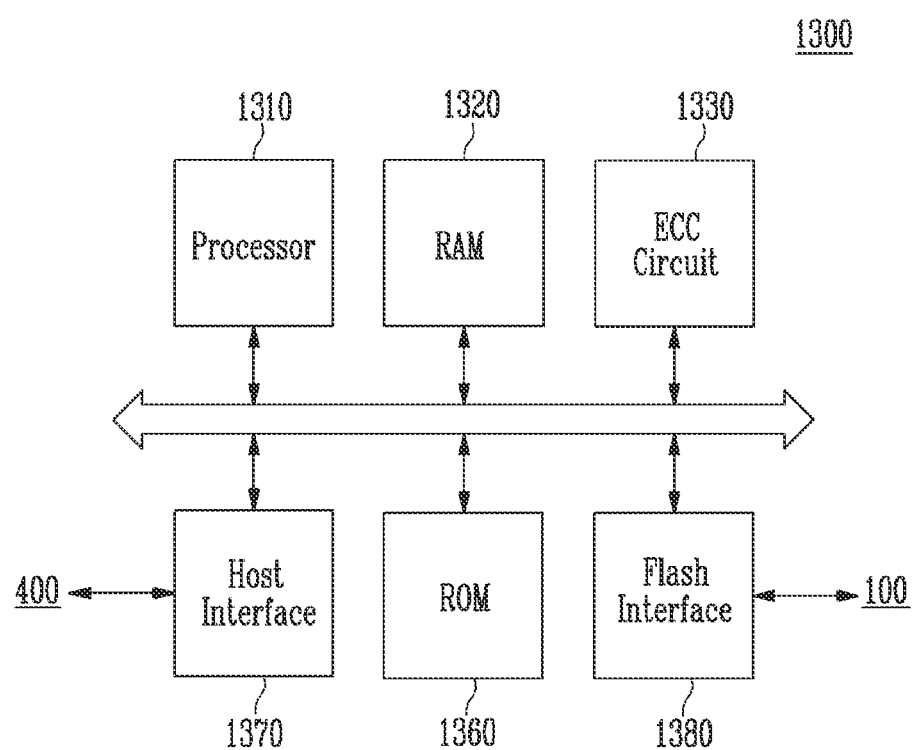
FIG. 9 is a diagram illustrating a memory controller according to an embodiment of the present disclosure.

FIG. 9 is a block diagram illustrating a memory controller 1300 according to an embodiment of the present disclosure.

Referring to FIG. 9, the memory controller 1300 may include a processor 1310, a RAM 1320, an error correction code (ECC) circuit 1330, a ROM 1360, a host interface 1370, and a flash interface 1380. The memory controller 1300 as shown in FIG. 9 may correspond to an embodiment of the memory controller 200 as shown in FIG. 4.

The processor 1310 may communicate with the host 2000 using the host interface 1370 and perform a logical operation so as to control operations of the memory controller 1300. For example, the processor 1310 may load program commands, data files, data structures, etc. based on a request from the host 2000 or an external device, and may perform various types of operations, or generate commands or addresses. For example, the processor 1310 may generate various commands for a program operation, a read operation, an erase operation, a suspend operation, and a parameter setting operation.

In addition, the processor 1310 may function as a flash translation layer FTL. The processor 1310 may translate a logical block address LBA provided by the host 2000 into a physical block address PBA through the flash translation layer FTL. The flash translation layer FTL may receive the logical block address LBA and translate the logical block address LBA into the physical block address PBA by using a mapping table. There may be various address mapping methods of the flash translation layer FTL, based on a mapping unit. Typical address mapping methods may include a page mapping method, a block mapping method, and a hybrid mapping method.

In addition, the processor 1310 may generate a command without a request from the host 2000. For example, the processor 1310 may generate a command for background operations such as wear leveling operations of the memory device 100 and garbage collection operations of the memory device 100.

The RAM 1320 may serve as an operation memory, a cache memory or a buffer memory of the processor 1310. The RAM 1320 may store codes and commands executed by the processor 1310. The RAM 1320 may store data which is processed by the processor 1310. In addition, the RAM 1320 may be realized with static RAM (SRAM) or dynamic RAM (DRAM).

The ECC circuit 1330 may detect errors during a program operation or a read operation and correct the detected errors. More specifically, the ECC circuit 1330 may perform an error correction operation according to an error correction code (ECC). In addition, the ECC circuit 1330 may perform ECC encoding based on data to be written to the memory device 100. The ECC-encoded data may be transferred to the memory device 100 through the flash interface 1380. In addition, the ECC circuit 1330 may perform ECC decoding based on data received from the memory device 100 through the flash interface 1380.

The ROM 1360 may serve as a storage unit which stores various types of information for operations of the memory controller 1300. More specifically, the ROM 1360 may include a map table, and the map table may include physical-logical address information and logical-physical address information. The ROM 1360 may be controlled by the processor 1310.

The host interface 1370 may include a protocol for data exchange between the host 2000 and the memory controller 1300. More specifically, the host interface 1370 may communicate with the host 2000 through one or more various communication standards or interfaces such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer system interface (SCSI) protocol, an enhanced small disk interface (ESDI) protocol, an integrated drive electronics (IDE) protocol, a private protocol, etc.

The processor 1310 may control the flash interface 1380 to communicate with the memory device 100 using a communication protocol. More specifically, the flash interface 1380 may perform communication with the memory device 100 for commands, addresses, and data through a channel. For example, the flash interface 1380 may include a NAND interface.

According to the present disclosure, a memory controller supporting an improved management method of an encryption key and a storage device including the memory controller may be provided.

While the present invention has been described with respect to the specific embodiments, it will be apparent to those skilled in the art that various changes and modifications may be made without departing from the spirit and scope of the invention as defined in the following claims. Furthermore, the embodiments may be combined to form additional embodiments.

What is claimed is:

1. A storage device comprising:
 a memory device to which a namespace including a plurality of zones is applied;
 a cache memory caching a media encryption key corresponding to each of a plurality of key tags;
 an encryptor encrypting, in response to a write request input from a host, data by using the media encryption key cached in the cache memory and corresponding to a key tag included in the write request among the plurality of key tags, and outputting encrypted data; and
 a write operation controller controlling the memory device to store the encrypted data in the memory device,
 wherein the media encryption key is a second media encryption key generated based on a first media encryption key provided from the host and a Root of Trust (RoT) generated from the encryptor.

2. The storage device of claim 1, wherein the encryptor further performs a crypto-erase operation of discarding the encrypted data so as not to decrypt the encrypted data.

3. The storage device of claim 1, wherein the encryptor further receives an encrypted media encryption key and a key encryption key from the host and further decrypts the encrypted media encryption key by using the key encryption key.

4. The storage device of claim 1, wherein the encryptor generates the RoT corresponding to each of the plurality of zones.

5. The storage device of claim 4, wherein the encryptor further erases the RoT corresponding to one zone among the plurality of zones when a crypto-erase operation is performed on the one zone.

6. The storage device of claim 1, wherein:
 the encryptor further encrypts a key encryption key on the basis of the RoT when the encryptor further receives the key encryption key from the host, and
 the write operation controller further controls the memory device to store an encrypted key encryption key.

7. The storage device of claim 1, wherein the RoT is generated based on seed data, a random number, or a password input by a user.

8. A memory controller comprising:
 a cache memory caching a media encryption key corresponding to each of a plurality of key tags;
 an encryptor encrypting, in response to a write request input from a host, data by using the media encryption key cached in the cache memory and corresponding to a key tag included in the write request among the plurality of key tags, and outputting encrypted data; and
 a write operation controller controlling the memory device to store the encrypted data in the memory device,
 wherein the media encryption key is a second media encryption key generated based on a first media encryption key provided from the host and a Root of Trust (RoT) generated from the encryptor.

9. The memory controller of claim 8, wherein the encryptor further performs a crypto-erase operation of discarding the encrypted data so as not to decrypt the encrypted data.

10. The memory controller of claim 8, wherein the encryptor further receives an encrypted media encryption key and a key encryption key from the host and further decrypts the encrypted media encryption key by using the key encryption key.

11. The memory controller of claim 8, wherein the encryptor generates the RoT corresponding to each of a plurality of zones included in the memory device.

12. The memory controller of claim 11, wherein the encryptor further erases the RoT corresponding to one zone among the plurality of zones when a crypto-erase operation is performed on the one zone.

13. The memory controller of claim 8, wherein:
 the encryptor further encrypts a key encryption key on the basis of the RoT when the encryptor further receives the key encryption key from the host, and
 the write operation controller further controls the memory device to store the encrypted key encryption key.

14. The memory controller of claim 8, wherein the RoT is generated based on seed data, a random number, or a password input by a user.

15. An operating method of a controller, the operating method comprising:
 decrypting, through a plaintext first key, a first-encrypted second key to generate a plaintext second key;
 encrypting plaintext user data to be stored in a memory device, or decrypting the encrypted user data received from the memory device, through the plaintext second key; and
 encrypting, through a third key, the plaintext second key to generate a second-encrypted second key,
 wherein each of the plaintext user data, and the first-encrypted second key is provided from a host.

16. The operating method of claim 15, further comprising:
 decrypting, through the third key, the second-encrypted second key, to generate the plaintext second key.

17. The operating method of claim 15, further comprising:
 performing a crypto-erase operation of discarding the third key so as not to decrypt the plaintext second key.

18. The operating method of claim 15, wherein the third key corresponds to each of a plurality of zones included in the memory device to which a namespace is applied.

19. The operating method of claim 15, further comprising:
 encrypting, through the third key, the plaintext first key to generate an encrypted first key to be stored in the memory device.

20. The operating method of claim 19, wherein the decrypting the first-encrypted second key comprises:
 decrypting, through the third key, the encrypted first key received from the memory device, to generate the plaintext first key.

* * * * *